United States Patent
Choi et al.

(10) Patent No.: US 9,288,017 B2
(45) Date of Patent: *Mar. 15, 2016

(54) METHOD FOR SENDING/RECEIVING DATA IN A WIRELESS PACKET COMMUNICATION SYSTEM IN WHICH THERE IS SIMULTANEOUS COMMUNICATION WITH VARIOUS TERMINALS

(76) Inventors: Jeeyon Choi, Daejeon (KR); Sok-Kyu Lee, Daejeon (KR)

(*) Notice: Subject to any disclaimer, the term of this patent is extended or adjusted under 35 U.S.C. 154(b) by 0 days.

This patent is subject to a terminal disclaimer.

(21) Appl. No.: 13/525,220

(22) Filed: Jun. 15, 2012

(65) Prior Publication Data

US 2012/0263160 A1 Oct. 18, 2012

Related U.S. Application Data

(63) Continuation of application No. PCT/KR2010/009039, filed on Dec. 16, 2010.

(30) Foreign Application Priority Data

Dec. 18, 2009 (KR) .................. 10-2009-0127310
Feb. 4, 2010 (KR) .................. 10-2010-0010590
Jul. 9, 2010 (KR) .................. 10-2010-0066465

(51) Int. Cl.
*H04W 84/12* (2009.01)
*H04L 1/18* (2006.01)
*H04L 1/00* (2006.01)

(52) U.S. Cl.
CPC ............ *H04L 1/1887* (2013.01); *H04L 1/0083* (2013.01); *H04L 2001/0093* (2013.01)

(58) Field of Classification Search
CPC .................................................. H04W 84/12

USPC .......................................................... 370/328
See application file for complete search history.

(56) References Cited

U.S. PATENT DOCUMENTS 7,317,735 B1 * 1/2008 Ojard ............................ 370/470
7,352,718 B1 4/2008 Perahia et al.

(Continued)

FOREIGN PATENT DOCUMENTS

DE 602004013049 T2 6/2009
EP 1592175 A1 2/2005

(Continued)

OTHER PUBLICATIONS

James Gross et al., "Multi-User OFDMA Frame Aggregation for Future Wireless Local Area Networking", Proceedings of IFIP/TC6 Networking 2009, May 11-15, 2009.

(Continued)

*Primary Examiner* — Sulaiman Nooristany

(57) ABSTRACT

A method and apparatus for transmitting a frame to at least one receiver in a wireless communication system is provided. The apparatus determines at least one data length in accordance with each receiver based on a number of symbol for the frame to be transmitted, determines a maximum data length among the at least one data length, and determines a length of the frame in time domain based on the maximum data length. The apparatus generates the frame in accordance with the length of the frame, the frame including a first signal field and at least one second signal field. The first signal field indicates the length of the frame and each second signal field indicates each data length.

6 Claims, 7 Drawing Sheets

(56) References Cited

U.S. PATENT DOCUMENTS

| | | | |
|---|---|---|---|
| 7,529,178 | B1 | 5/2009 | Loc |
| 2004/0228339 | A1* | 11/2004 | Gallo et al. .................... 370/379 |
| 2005/0014023 | A1 | 1/2005 | Yu et al. |
| 2011/0002319 | A1* | 1/2011 | Husen et al. .................... 370/338 |
| 2011/0032875 | A1* | 2/2011 | Erceg et al. .................... 370/328 |
| 2011/0038332 | A1* | 2/2011 | Liu et al. ....................... 370/329 |
| 2011/0134900 | A1* | 6/2011 | Liu et al. ....................... 370/338 |
| 2011/0188482 | A1 | 8/2011 | Vermani et al. |
| 2012/0195302 | A1* | 8/2012 | Park et al. ..................... 370/338 |

FOREIGN PATENT DOCUMENTS

| | | | |
|---|---|---|---|
| JP | 2005-303585 A | 10/2005 | |
| JP | 2006-506002 A | 2/2006 | |
| JP | 2006-287980 A | 10/2006 | |
| JP | 2008-522497 A | 6/2008 | |
| JP | 2009-005409 A | 1/2009 | |
| JP | 2010-263490 A | 11/2010 | |
| JP | 4690401 B2 | 2/2011 | |
| JP | 2013-502157 A | 1/2013 | |
| JP | 2013-514010 A | 4/2013 | |
| JP | 2013-514011 A | 4/2013 | |
| KR | 1020020049790 A | 6/2002 | |
| KR | 1020060029159 A | 4/2006 | |
| KR | 10-2006-0081329 A | 7/2006 | |
| KR | 10-2008-0114376 A | 12/2008 | |
| KR | 1020090026096 A | 3/2009 | |
| KR | 1020090031434 A | 3/2009 | |
| WO | WO 02/41647 A2 | 5/2002 | |
| WO | WO 2004/042991 A1 | 5/2004 | |
| WO | WO 2005/067218 A1 | 7/2005 | |
| WO | WO 2006/019579 A2 | 2/2006 | |
| WO | WO 2006/058058 A2 | 6/2006 | |
| WO | WO 2009/109894 A1 | 9/2009 | |
| WO | WO 2011/019571 A1 | 2/2011 | |
| WO | WO 2011/072164 A2 | 6/2011 | |
| WO | WO 2011/072173 A2 | 6/2011 | |

OTHER PUBLICATIONS

Kenichi Kuri et al., "Long TTI operation for TDD frame structure reated to HARQ timing (15.3.9.2.2.1)", IEEE 802.16 Broadband Wireless Access Working Group, Aug. 29, 2009, IEEE.
International Search Report for PCT/KR2010/009039 filed on Dec. 16, 2010.
Extended European Search Report for EP Application No. 10 83 7900 of Dec. 11, 2012.
Office Action and List of References cited by the examiner for U.S. Appl. No. 13/596,328 dated Dec. 12, 2012.
Office Action for German Patent Application No. 112010004877.0, dated Nov. 21, 2013.

* cited by examiner

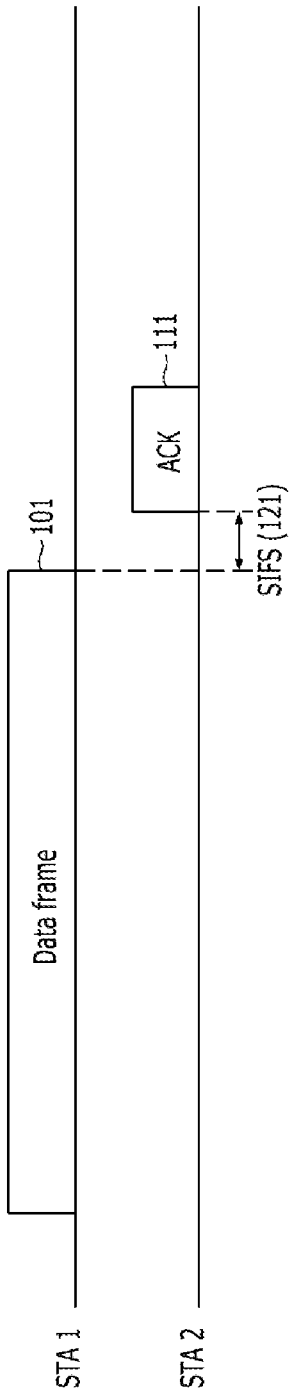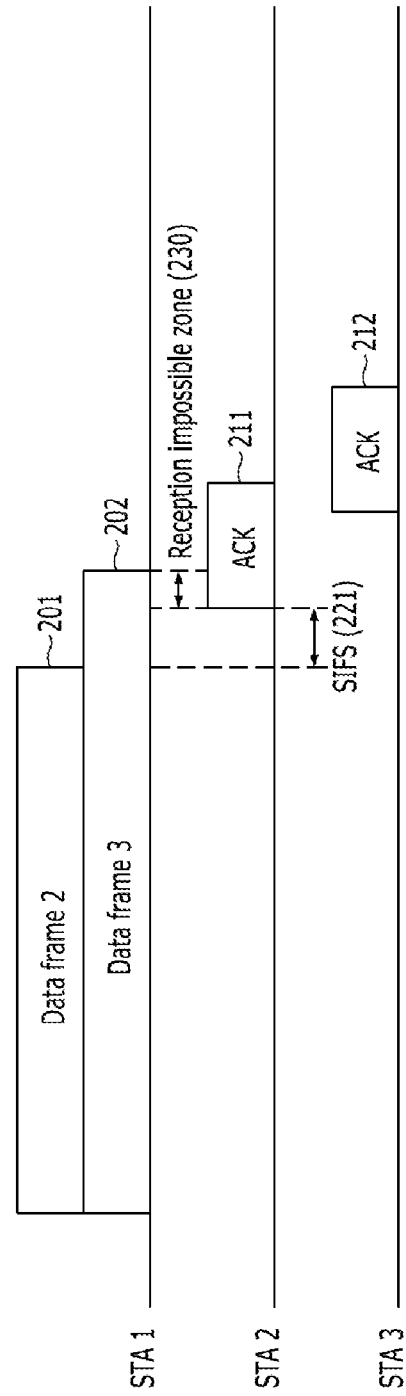

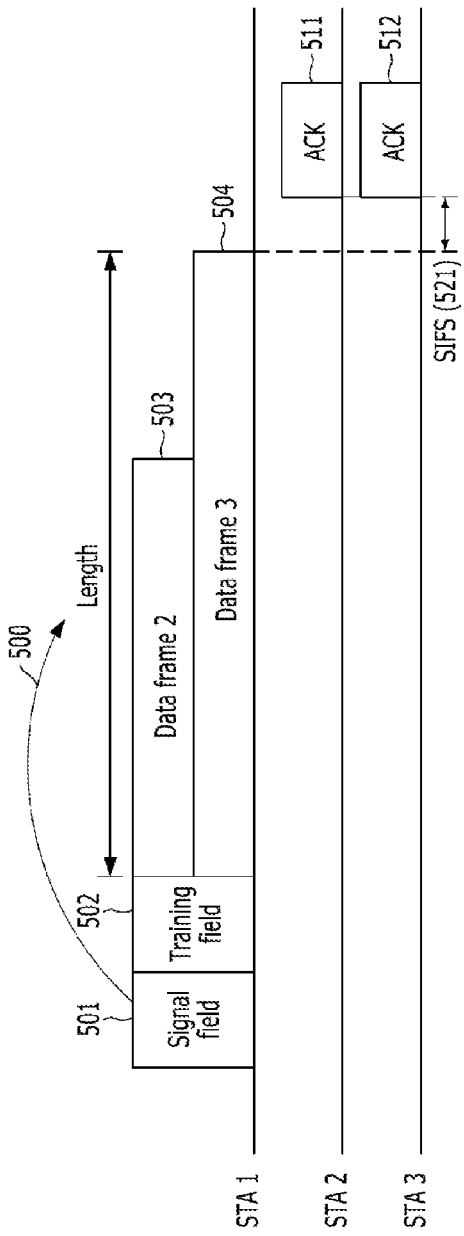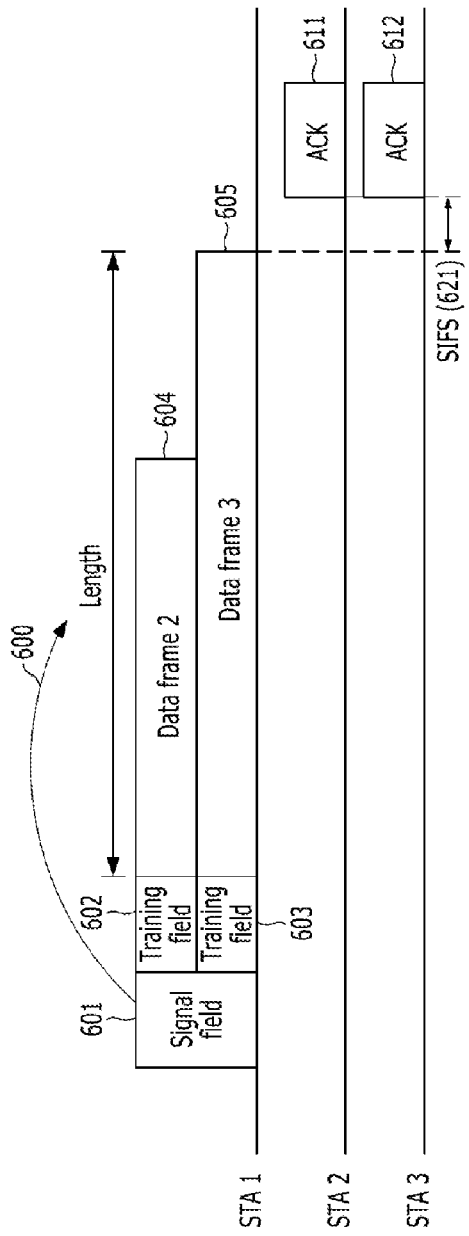

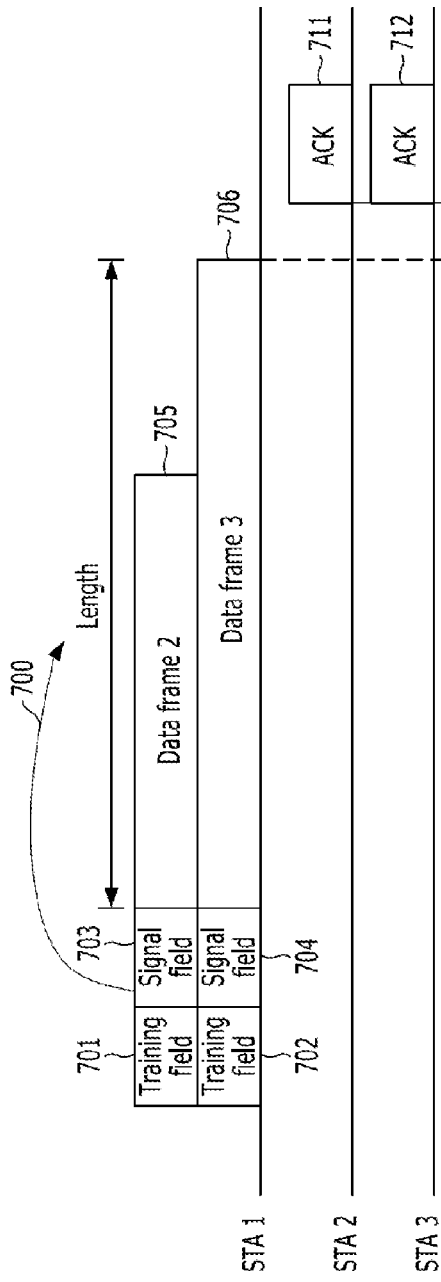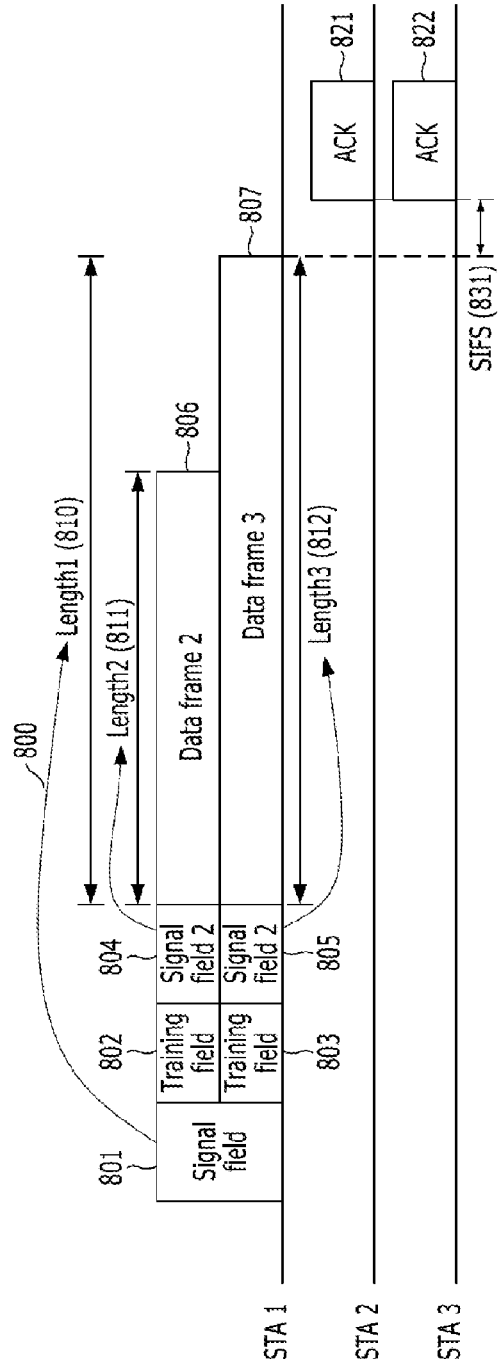

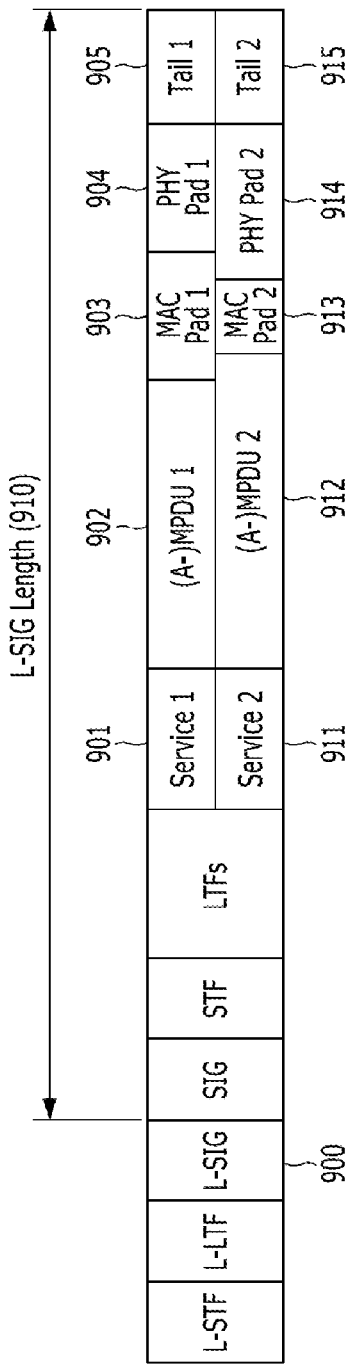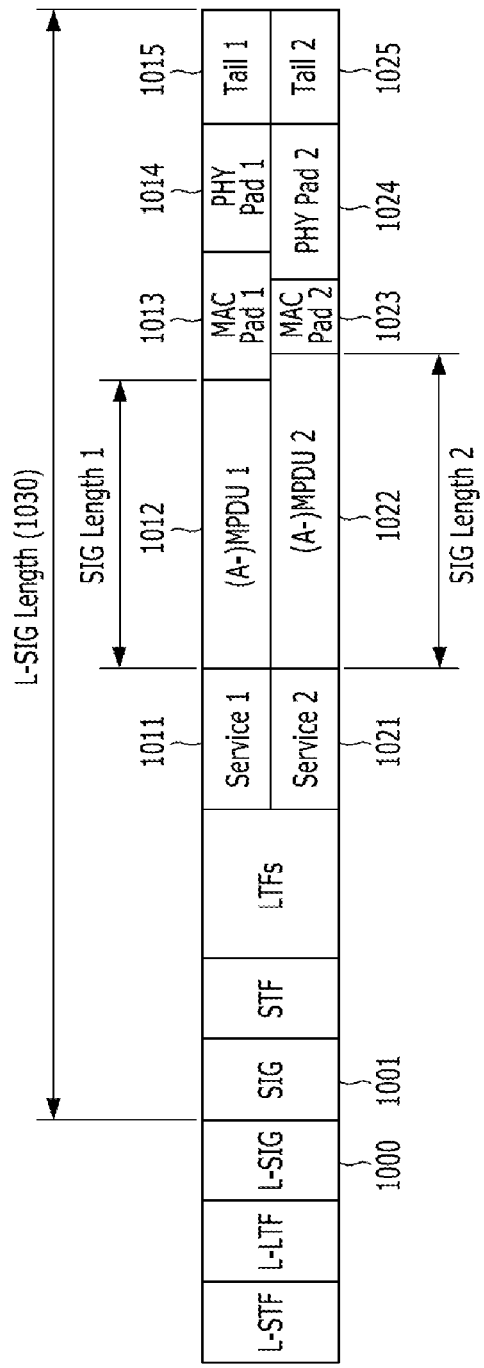

METHOD FOR SENDING/RECEIVING DATA IN A WIRELESS PACKET COMMUNICATION SYSTEM IN WHICH THERE IS SIMULTANEOUS COMMUNICATION WITH VARIOUS TERMINALS

TECHNICAL FIELD

Exemplary embodiments of the present invention relate to a method for transmitting/receiving data when one station is to communicate with several stations at the same time, in a wireless packet communication system, in particular, a near field wireless communication system.

BACKGROUND ART

Basically, the wireless LAN supports a basic service set (BBS) including an access point (AP) and a plurality of wireless stations excluding the AP. The AP serves as an access point of a distribution system (DS). Hereafter, the AP and the stations are commonly called 'station'.

According to the IEEE 802.11n standard, when a station receives a data frame, the station transmits an acknowledgement (ACK) signal after a short inter frame space (SIFS) in order to increase the transmission efficiency in a media access control (MAC) layer, even though there is a difference depending on a policy for an ACK signal required by the corresponding data frame.

FIG. 1 is a timing diagram explaining data transmission in the MAC layer according to the IEEE 802.11 standard.

When a station 1 transmits a data frame 101 to a station 2, the station 2 receives the corresponding data frame and then transmits an ACK signal 111 after an SIFS which is a predetermined time. Such a method shown in FIG. 1 is frequently used in the MAC layer of the wireless LAN.

Meanwhile, as the number of users using the wireless LAN has rapidly increased, the request to improve data throughput provided by one BSS is increasing. In the existing wireless LAN, one station may communicate with only one station at a certain moment. However, research has been conducted on technology which enables one station to communicate with several stations at the same time, in order to provide a gigabit or more throughput. As the representative technology, a multi-user MIMO (hereafter, MU-MIMO) scheme and a multi-frequency channel scheme are provided.

When those schemes are used, one station may operate as if the station transmits and receives frames to and from several terminals through several independent communication paths, respectively. Accordingly, the station may transmit data to several stations at the same time. As a result, it is possible to significantly increase the throughput of the BSS.

However, when using the several communication paths at the same time, the station has a limitation in which the transmission and the reception cannot be performed at the same time through all the used communication paths. For example, when a certain station uses a communication path 1 and a communication path 2 at the same time, the communication path 1 cannot be used for transmission in case where the communication path 2 is used for reception.

All data frames used in the wireless LAN have a variable length. As described above, an ACK or a block ACK is transmitted immediately after a predetermined time passes from a time point when the reception of data frames is completed. Therefore, when data frames are simultaneously to several stations through several communication paths, the respective stations will transmit an ACK immediately after a predetermined time passes from a time point when the reception of the data frames having different lengths was completed. That is, a station having received a data frame having the shortest length may transmit an ACK, before the transmission of the data frames to the other stations is completed. In this case, the corresponding ACK may not be received.

This will be described with reference to FIG. 2.

In FIG. 2, it is assumed that stations 1 and 2 exist and data are transmitted between the stations 1 and 2 through different communication paths. That is, when the station 1 transmits a data frame 201 and a data frame 202 having different lengths, the transmission of the data frame 201 having a shorter length may be first completed. In this case, when the length of the data frame 201 is smaller than that of the data frame 202 by an SIFS 221 or more, the station 2 transmits an ACK 211 immediately after the SIFS 221 passes from a time point when the reception of the data frame 201 is completed.

However, since the station 1 is still transmitting the data frame 202 at the time point when the station 2 transmits the ACK 211, a reception impossible section 230 occurs, in which the station 1 cannot receive the ACK 212 transmitted by the station 2.

DISCLOSURE

Technical Problem

An embodiment of the present invention is directed to a method capable of informing stations of the length of a data frame having the largest length among data frames to be transmitted to the respective stations, when several communication paths are used.

Another embodiment of the present invention is directed to a method in which a reception station transmits an ACK in a predetermined time after a time corresponding to the length of the largest data frame passes, thereby preventing a reception impossible zone from occurring.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

Technical Solution

In accordance with an embodiment of the present invention, there is provided a data transmission method in which a transmission station transmits different data at the same time. The data transmission method includes: acquiring length information of data having the largest length among the different data; generating a first signal field containing the length information of the data having the largest length; and transmitting the first signal field such that all stations receive the first signal field.

In accordance with another embodiment of the present invention, there is provided a data reception method in which a reception station receives data from a transmission station transmitting different data to a plurality of reception stations at the same time. The data reception method includes: receiving a first signal field containing length information of data having the largest length among the different data transmitted to the respective reception stations at the same time; receiving data; and waiting for a predetermined time after a time indicated by the length information based on the length information contained in the first signal field, and transmitting an acknowledgement (ACK) of the received data.

Advantageous Effects

In accordance with the embodiment of the present invention, when one station transmits data to several stations at the same time by using several communication paths and receives ACK signals, a reception impossible zone does not occur. Therefore, communication may be smoothly performed.

DESCRIPTION OF DRAWINGS

FIG. 1 is a timing diagram explaining data transmission in a MAC layer according to the IEEE 802.11 standard.

FIG. 2 is a diagram showing a case in which a problem occurs due to the superposition of ACK signals depending on data lengths for several communication paths used in a wireless communication system.

FIG. 5 is a timing diagram in a case in which the entire PHY overhead is transmitted by using a communication path through which all stations may receive data in accordance with a first embodiment of the present invention.

FIG. 6 is a timing diagram in a case in which a part of the PHY overhead is transmitted by using a communication path through which all stations may receive data, and the other parts of the PHY overhead are transmitted by using communication paths independent of each other in accordance with a second embodiment of the present invention.

FIG. 7 is a timing diagram in a case in which the entire PHY overhead is transmitted by using communication paths independent of each other in accordance with a third embodiment of the present invention.

FIG. 8 is a timing diagram in a case in which a signal field is divided into two parts in accordance with the fourth embodiment of the present invention.

FIG. 9 is a diagram showing a case in which length information contained in an L-SIG field is used in accordance with the embodiment of the present invention.

FIG. 10 is a diagram showing a case in which length information contained in an L-SIG field is used to represent the time length of the longest data frame and an SIG field contains length information on the data amounts of data frames to be transmitted to the respective stations.

BEST MODE

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

A wireless communication system includes a MAC layer and a physical (PHY) layer, each of which attaches overhead information required for processing data. Therefore, a transmission unit of the PHY layer attaches information for data processing of the PHY layer to data received from the MAC layer and then transmits the data through a wireless channel, and a reception unit of the PHY layer extracts data to be transferred to the MAC layer by using the attached information.

Figure 3:
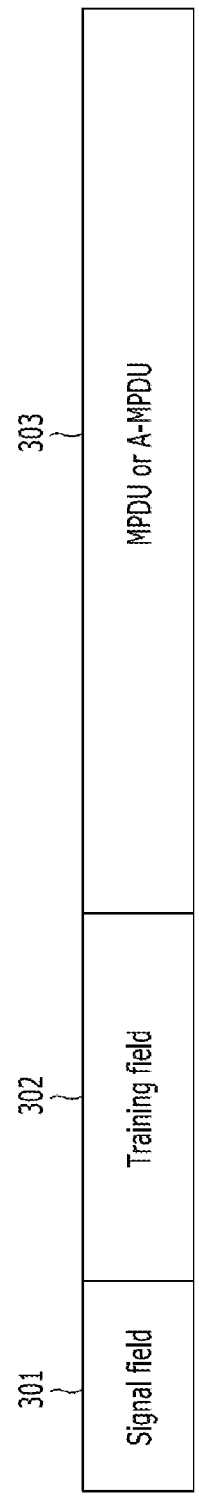
FIG. 3 is a diagram showing the structure a general PPDU used in a wireless communication system.

At this time, a PHY protocol data unit (PPDU) which is outputted to the wireless channel by the PHY layer has a structure as shown in FIG. 3.

The overhead information used in the PHY layer may be roughly divided into a signal field 301 and a training field 302. The training field 302 is used for synchronization detection and wireless channel estimation, and the signal field 302 is used for extracting MAC data (MPDU or A-MPDU) 303.

Figure 4:
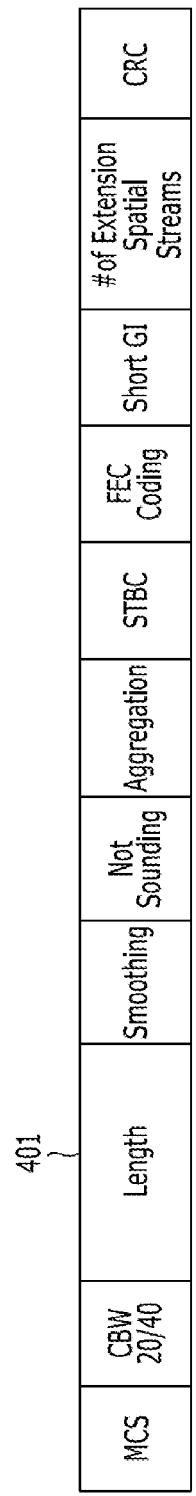
FIG. 4 is a diagram showing a signal field used in a wireless LAN system.

A signal field defined in the IEEE 802.11n standard which provides the highest data rate, among current wireless LAN standards, has a structure as shown in FIG. 4.

Among elements composing the signal field, Length 401 is information representing the length of MAC data included in the corresponding PPDU, and the PHY layer is set to transfer the extracted MAC data and the length information to the MAC layer.

In this embodiment of the present invention, the length information is used to inform the respective stations of the largest value among the time lengths of the data frames transmitted to several stations at the same time. A communication method using this will be described briefly as follows.

A station which is to simultaneously transmit data to several stations by using several communication channels at the same time attaches a PHY layer overhead in front of the data frames to be transmitted to the respective stations. At this time, length information included in a signal field is set to represent the largest value among the time lengths of the data frames to be transmitted to the respective stations at the same time. Therefore, a station receiving data will transmit an ACK after a time indicated by the length information of the signal field passes, although the reception of the data frames was completed.

Then, the several stations which have simultaneously received the data frames may transmit ACK signals at the same time. Therefore, a reception impossible zone does not occur, which has occurred when the conventional technology was used.

Here, a method of representing a time length needs to be calculated in the same time unit for all modulation and coding schemes (MCS). Therefore, the number of symbols constructing a data frame or a time-unit length such as microsecond may be used.

A method of attaching a PHY overhead, to which the embodiment of the present invention is applied, will be described below.

First Embodiment

In a first embodiment of the present invention, the entire PHY overhead is transmitted by using a communication path through which all stations may receive data. This will be described with reference to FIG. 5.

FIG. 5 is a timing diagram in a case in which the entire PHY overhead is transmitted by using a communication path through which all stations may receive data in accordance with the first embodiment of the present invention.

In FIG. 5, it is assumed that station 1 transmits data frames 503 and 504 having different lengths to stations 2 and 3, respectively.

The station 1 transmits a signal field 510 and a training field 502 through bands or paths of the data frames 503 and 504, in order to transmit the entire PHY overhead to all the stations. At this time, length information included in the signal field 501 is set to indicate the length of the data frame 504, because the data frame 504 has the largest length. That is, the length information represents the length of the data frame 504, as indicated by an arrow 500 in the signal field 501.

Then, the stations 2 and 3 receive the data frames 503 and 504 by using the length information of the signal field 501, and transmit ACK signals 511 and 512 corresponding to the respective data frames 503 and 504 after waiting for a predetermined SIFS 521.

Second Embodiment

Next, a second embodiment of the present invention will be described. In the second embodiment, a part of a PHY overhead is transmitted by using a communication path through which all stations may receive data, and the other parts of the PHY overhead are transmitted by using communication paths independent of each other. This will be described with reference to FIG. 6.

FIG. 6 is a timing diagram in a case in which a part of the PHY overhead is transmitted by using a communication path through which all stations may receive data, and the other parts of the PHY overhead are transmitted by using communication paths independent of each other in accordance with the second embodiment of the present invention.

In FIG. 6, it is also assumed that the station 1 transmits data frames 604 and 605 having different lengths to the stations 2 and 3, respectively.

The station 1 transmits a signal field 601 by using a communication path through which all stations may receive data. Furthermore, training fields 602 and 603 are transmitted only through communication paths for the respective data frames 604 and 605. That is, the training field 602 for detecting the data frame 604 is transmitted only through the communication path for transmitting the data frame 604, and the training field 603 for detecting the data frame 605 is transmitted only through the communication path for transmitting the data frame 605.

Although the transmission is performed in such a manner, the stations 2 and 3 may confirm the length of the data frame 605, because the signal field 601 represents the length of the data frame 605 which is the longest frame between the data frames 604 and 605, as indicated by reference numeral 600.

Therefore, the stations 2 and 3 may wait for an SIFS 621 which is a predetermined time, after a time corresponding to the value indicated by the length information, and then transmit ACK signals 611 and 612 corresponding to the respective data frames 604 and 605.

Third Embodiment

In a third embodiment of the present invention, the entire PHY overhead is transmitted by using communication paths independent of each other. This will be described with reference to FIG. 7.

FIG. 7 is a timing diagram in a case in which the entire PHY overhead is transmitted by using communication paths independent of each other in accordance with the third embodiment of the present invention.

In FIG. 7, it is also assumed that the station 1 transmits data frames 704 and 705 having different lengths to the stations 2 and 3, respectively.

In FIG. 7, training fields 701 and 702 and signal fields 703 and 704 are transmitted in correspondence to the data frames 704 and 705. That is, the training field 701 and the signal field 703 are transmitted through the communication path of the data frame 705, and the training field 702 and the signal field 704 are transmitted through the communication path of the data frame 706.

At this time, the signal fields 703 and 704 represent the length of the data frame 706 which is the longest frame between the data frames 705 and 706, as indicated by reference numeral 700. That is, even when the signal fields 703 and 704 are transmitted by using communication paths independent of each other, the length information contained in the signal field 703 should be identical to the length information contained in the signal field 704.

Therefore, when receiving the data frame 705 and the data frame 706, the stations 2 and 3 wait for an SIFS 721 which is a predetermined time, after the reception of the data frame 706 is completed, and then transmit ACK signals 711 and 712 corresponding to the respective data frames 705 and 706.

Fourth Embodiment

In a fourth embodiment of the present invention, a part of a signal field is transmitted by using a communication path through which all stations may receive data, and the other part of the signal field is transmitted by using communication fields independent of each other. This will be described with reference to FIG. 8.

FIG. 8 is a timing diagram in a case in which a signal field is divided into two parts, one signal field is transmitted through the communication path through which all stations may receive data, and the other signal field is transmitted by using communication fields independent of each other in accordance with the fourth embodiment of the present invention.

In FIG. 8, it is also assumed that the station 1 transmits data frames 806 and 807 having different lengths to the stations 2 and 3.

Referring to FIG. 8, a signal field 801 transmitted by using a communication path through which all stations may receive data is set to represent a length corresponding to the data frame 807 having the largest length between the respective data frames 806 and 807. Through this process, response times of different frames may be confirmed as described above.

Next, training fields 802 and 803 are transmitted through the corresponding communication paths of the respective data frames 806 and 807. Then, signal fields 804 and 805 for indicating the lengths of the respective data frames 806 and 807 are contained. That is, the signal field 801 transmitted through the communication path through which all stations may receive data indicates Length1 810 representing the length of the longest data frame, the signal field 804 corresponding to the data frame 806 indicates Length2 811, and the signal field 805 corresponding to the data frame 807 indicates Length3 812. Therefore, the length 810 of the actual data frame and the data frames 806 and 807 may be transmitted by the respective signal fields. At this time, the length information contained in the signal field 804 may include a time length or a length representing a data amount, for example, a length in the unit of byte.

Then, the stations 2 and 3 receiving the data frames wait for an SIFS 831 which is a predetermined time from a time point when the transmission of the data frame 807 which is the longest frame between the data frames 806 and 807 is completed, and then transmit ACK signals 821 and 822 corresponding to the respective data frames 806 and 807.

In the above-described four embodiments of the present invention, it has been described that stations which have simultaneously received data frames transmit ACK signals or block ACK frames corresponding to the data frames at the same time. However, the stations may sequentially transmit ACK signals or block ACK frames, depending on a protocol. In this case, the transmission time of an ACK signal or block ACK frame which is to be first transmitted may be decided by the method in accordance with the embodiments of the present invention, and the transmission time of an ACK signal or block ACK frame which is to be transmitted later may be decided by another method.

Furthermore, the structure of the frames used in the four embodiments described with reference to the above drawings is a conceptual structure. Therefore, when the frames are actually applied, the frames may have a variety of specific forms.

In the wireless LAN, the backward compatibility with the existing technology is considered to be very important. Therefore, even when a more advanced method is used, a disadvantage should not be given to a station using the existing method. Accordingly, a PHY layer overhead of the existing method needs to be added in front of a frame using the new method such that the station using the existing method may perceive the length of the frame having a new structure. In this case, length information contained in an L-SIG field which is one of the PHY layer overheads in the existing method may be used to represent the largest value among time lengths of data frames which are to be transmitted to the respective terminals at the same time.

A method of representing the length information of a frame may include a method based on time such as several microseconds or several symbol lengths and a method based on data amount such as several bytes or several words. Depending on which method is used between them, the position of a tail used for coding and decoding of the PHY layer may be changed.

Based on this, specific examples of the transmitted frame will be described with reference to FIGS. 9 to 13. At this time, a long training field (LTF) may be transferred by using a communication path through which all stations may receive data, as shown in FIG. 5, or may be transferred by using a communication path through only each station may receive data, as shown in FIGS. 6 to 8.

FIG. 9 is a diagram showing a case in which length information contained in the L-SIG field is used to represent only a time length of the longest data frame.

FIG. 9 shows a case in which different MPDUs or A-MPDUs 902 and 912 are transmitted. In the following descriptions, it is assumed that the MPDUs 902 and 912 having different lengths from each other are transmitted.

Since the end positions of frames for transmitting the MPDUs 902 and 912 having different lengths to several stations at the same time should be matched with each other, pads should be inserted into the MAC layer and the PHY layer in order to remove a difference between the positions. That is, a MAC pad 903 is added to the back of the MPDU 902, and a PHY pad 904 and a tail 905 are sequentially added. Here, Service 1 (901) indicates a field for representing a scramble seed of the PHY layer. Furthermore, a MAC pad 913 is added to the back of the MPDU 912, and a PHY pad 914 and a tail 915 are sequentially added. Here, Service 2 (902) indicates a field for representing a scramble seed of the PHY layer.

As described above, information for representing the entire length information according to an MPDU having the largest length between the MPDUs 902 and 912 having different lengths may be transmitted by using the length value of the L-SIG field 900, as indicated by reference numeral 910. At this time, the length value of the L-SIG field may be used as a time length as it is, or may be converted into a time length by another method.

FIG. 10 is a diagram showing a case in which length information contained in an L-SIG field is used to represent the time length of the longest data frame and an SIG field contains length information on the data amounts of data frames to be transmitted to the respective stations.

FIG. 10 shows a case in which different MPDUs or A-MPDUs 1012 and 1022 are transmitted. In the following descriptions, it is assumed that the MPDUs 1012 and 1022 having different lengths from each other are transmitted.

Since the end positions of frames for transmitting the MPDUs 1012 and 1022 having different lengths to several stations at the same time should be matched, pads should be inserted into the MAC layer and the PHY layer in order to remove a difference between the positions. That is, a MAC pad 1013 is added to the back of the MPDU 1012, and a PHY pad 1014 and a tail 1015 are sequentially added. Here, Service 1 (1011) indicates a field for representing a scramble seed of the PHY layer. Furthermore, a MAC pad 1023 is added to the back of the MPDU 1022, and a PHY pad 1024 and a tail 1025 are sequentially added. Here, Service 2 (1021) indicates a field for representing a scramble seed of the PHY layer.

As described above, information for representing the entire length information according to an MPDU having the largest length between the MPDUs 1012 and 1022 having different lengths may be transmitted by using the length value of the L-SIG field 1000, as indicated by reference numeral 1030. Furthermore, the information of the respective MPDUs 1012 and 1022 may be represented by SIG Length1 and SIG Length2 in an SIG field 1001.

In such a structure as shown in FIG. 10, the PHY layer of a reception station may turn off a reception function of the station, after decoding of data corresponding to the length of a frame transmitted to the PHY layer is completed. Therefore, power consumption may be effectively reduced.

Figure 11:
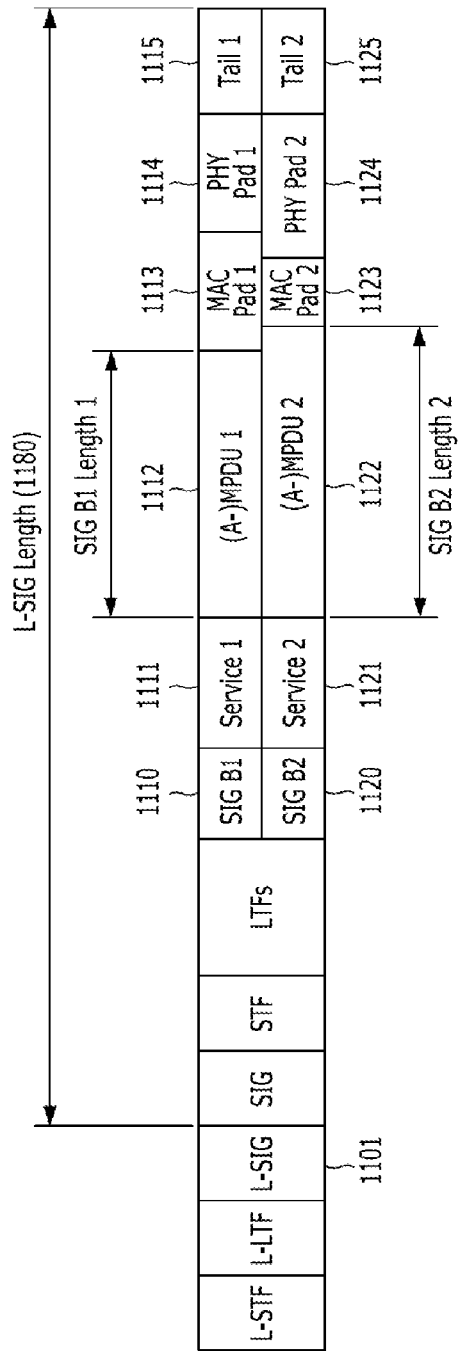
FIG. 11 is a diagram showing a case in which length information contained in an L-SIG field is used to represent the time length of the longest data frame and SIG B fields included in the respective communication fields contain length information on the data amounts of data frames to be transmitted to the respective stations.

FIG. 11 is a diagram showing a case in which length information contained in an L-SIG field is used to represent the time length of the longest data frame and SIG B fields included in the respective communication fields contain length information on the data amounts of data frames to be transmitted to the respective stations.

FIG. 11 shows a case in which different MPDUs or A-MPDUs 1112 and 1122 are transmitted. In the following descriptions, it is assumed that the MPDUs 1112 and 1122 having different lengths from each other are transmitted.

Since the end positions of frames for transmitting the MPDUs 1112 and 1122 having different lengths to several stations at the same time should be matched, pads should be inserted into the MAC layer and the PHY layer in order to remove a difference between the positions. That is, a MAC pad 1113 is added to the back of the MPDU 1112, and a PHY pad 1114 and a tail 1115 are sequentially added. Here, Service 1 (1111) indicates a field for representing a scramble seed of the PHY layer, and SIG B (1110) indicates a field for representing the length of the MPDU 1112.

Furthermore, a MAC pad 1123 is added to the back of the MPDU 1122, and a PHY pad 1124 and a tail 1125 are sequentially added. Here, Service2 (1121) indicates a field for representing a scramble seed of the PHY layer, and SIG B2 (1120) indicates a field for representing the length of the MPDU1 1122.

As described above, information for representing the entire length information according to an MPDU having the largest length between the MPDUs 1112 and 1122 having different lengths may be transmitted by using the length value of the L-SIG field 1000, as indicated by reference numeral 1130. Furthermore, the information of the respective MPDUs 1112 and 1122 may be indicated by SIG Length1 and SIG Length2 in an SIG B1 field 1110 and an SIG B2 field 1120, respectively.

In such a structure as shown in FIG. 11, the PHY layer of a reception station may turn off a reception function of the station, after decoding of data corresponding to the length of a frame transmitted to the PHY layer is completed. Therefore, power consumption may be effectively reduced.

Figure 12:
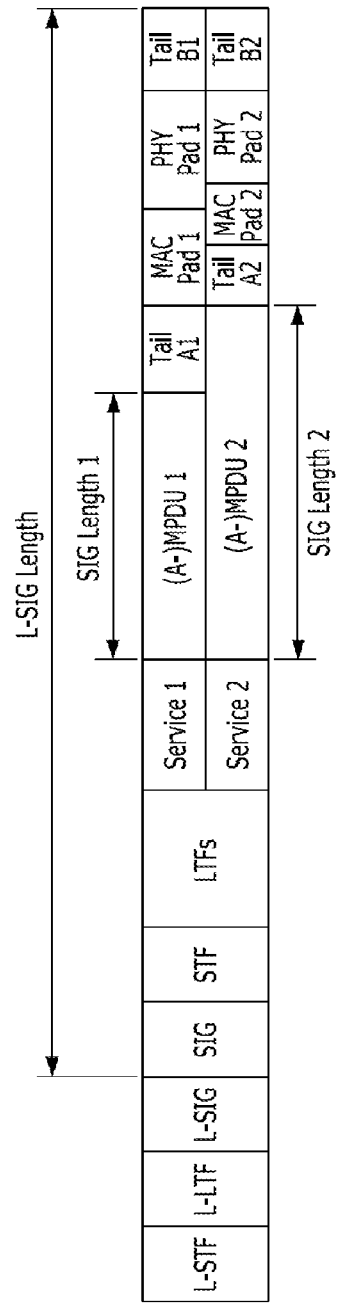
FIG. 12 is a diagram showing a case in which a tail is additionally attached to the back of an MPDU or A-MPDU.
Figure 13:
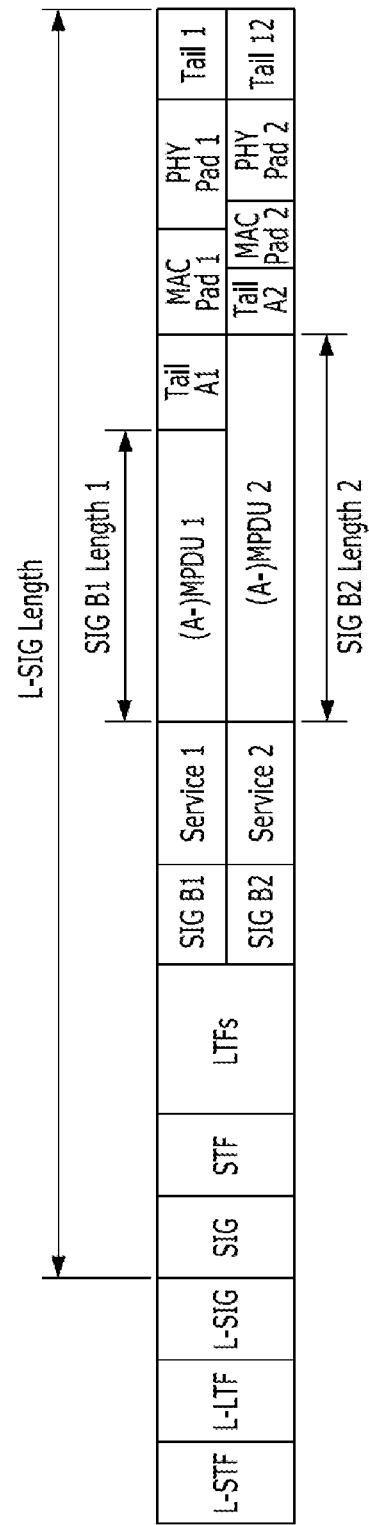
FIG. 13 is a diagram showing a case in which a tail is additionally attached to the back of an MPDU or A-MPDU.

FIGS. 12 and 13 show the same structures as shown in FIGS. 10 and 11, respectively, except that a tail is additionally attached to the back of a MPDU or A-MPUD. When such a structure is used, decoding of the MPDU or A-MPUD may be terminated immediately after Tail A. Therefore, the power consumption in the reception station may be more effectively reduced than in the structures of FIGS. 10 and 11.

While the present invention has been described with respect to the specific embodiments, it will be apparent to those skilled in the art that various changes and modifications may be made without departing from the spirit and scope of the invention as defined in the following claims.

INDUSTRIAL APPLICABILITY

Embodiments of the present invention are applied to a WLAN system using multiple user and multiple access.

The invention claimed is:

1. A method for receiving data in a wireless communication system, the method comprising:
   receiving and decoding, by a receiver, a Physical layer Protocol Data Unit (PPDU) from a transmitter, the PPDU including a first signal field and a plurality of second signal fields,
   wherein the first signal field in the PPDU is received via a first communication path that is common to a set of receivers to which the receiver belongs,
   wherein at least one of the plurality of second signal fields in the PPDU is received via a second communication path that is specific to the receiver,
   wherein a total length of the PPDU in a time domain is determined based on a maximum data length among a plurality of data lengths,
   wherein the plurality of data lengths are determined in accordance with a plurality of receivers based on a number of symbols used for the PPDU, each of the plurality of data lengths corresponding to a corresponding one of the plurality of receivers, and
   wherein the first signal field indicates the total length of the PPDU, and each of the plurality of second signal fields indicates a data length for a corresponding one of the plurality of receivers.

2. The method of claim 1, wherein the first signal field is a legacy signal (L-SIG) field.

3. The method of claim 1, wherein the first signal field indicates a length between the end of the first signal field and the end of the PPDU.

4. An apparatus configured for receiving data in a wireless communication system, the apparatus comprising:
   a receiving circuitry configured to receive a Physical layer Protocol Data Unit (PPDU) from a transmitter; and
   a processing circuitry configured to decode the PPDU, the PPDU including a first signal field and a plurality of second signal fields,
   wherein the first signal field in the PPDU is received via a first communication path that is common to a set of receivers to which the apparatus belongs,
   wherein at least one of the plurality of second signal fields in the PPDU is received via a second communication path that is specific to the apparatus,
   wherein a total length of the PPDU in a time domain is determined based on a maximum data length among a plurality of data lengths,
   wherein the plurality of data lengths are determined in accordance with a plurality of receivers based on a number of symbols used for the PPDU, each of the plurality of data lengths corresponding to a corresponding one of the plurality of receivers, and
   wherein the first signal field indicates the total length of the PPDU, and each of the plurality of second signal fields indicates a data length for a corresponding one of the plurality of receivers.

5. The apparatus of claim 4, wherein the first signal field is a legacy signal (L-SIG) field.

6. The apparatus of claim 4, wherein the first signal field indicates a length between the end of the first signal field and the end of the PPDU.

* * * * *